Figure 7:
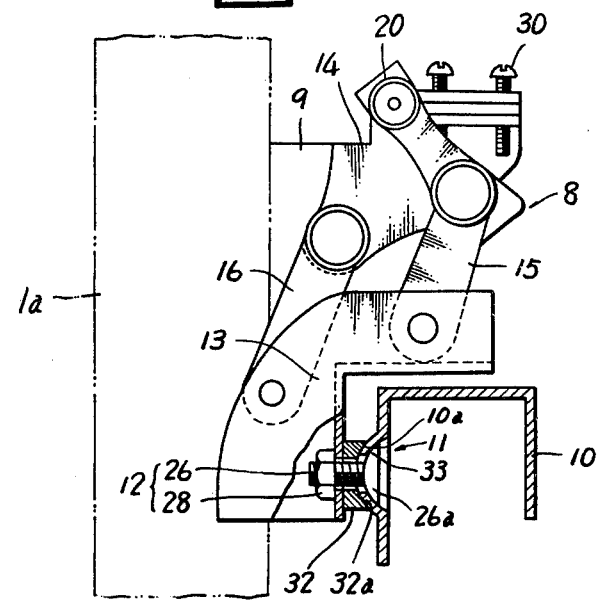

United States Patent [19]

Isobe

[11] 4,199,998
[45] Apr. 29, 1980

[54] FRONT DERAILLEUR

[75] Inventor: Mitsuhide Isobe, Toyonaka, Japan

[73] Assignee: Shimano Industrial Company Limited, Osaka, Japan

[21] Appl. No.: 880,130

[22] Filed: Feb. 22, 1978

[51] Int. Cl.² .................. B62M 9/12; B62M 25/00; F16H 11/08
[52] U.S. Cl. .................................. 74/217 B; 280/236
[58] Field of Search ............... 74/217 B; 403/61, 59; 280/236, 238, 289 R, 289 H

[56] References Cited

U.S. PATENT DOCUMENTS

| 2,697,975 | 12/1954 | Buhr | 403/61 |
| 3,813,955 | 6/1974 | Huret et al. | 74/217 B |
| 4,030,374 | 6/1977 | Isobe | 74/217 B |

*Primary Examiner*—Nile C. Byers, Jr.
*Assistant Examiner*—David C. Reichard
*Attorney, Agent, or Firm*—Stevens, Davis, Miller & Mosher

[57] ABSTRACT

A front derailleur for a bicycle, which is used to switch a driving chain to each of at least two sprockets, is provided with a fixing member, a chain guide and an adjuster provided between the fixing member and chain guide. The chain guide is supported with respect to the fixing member in relation of being movable axially of the sprockets and toward at least two positions corresponding to the sprockets respectively, and the adjuster is capable of desirably adjusting the chain guide in its position with respect to the fixing member correspondingly to each of the sprockets in use and has a sustainer for maintaining the adjuster position of the chain guide.

18 Claims, 11 Drawing Figures

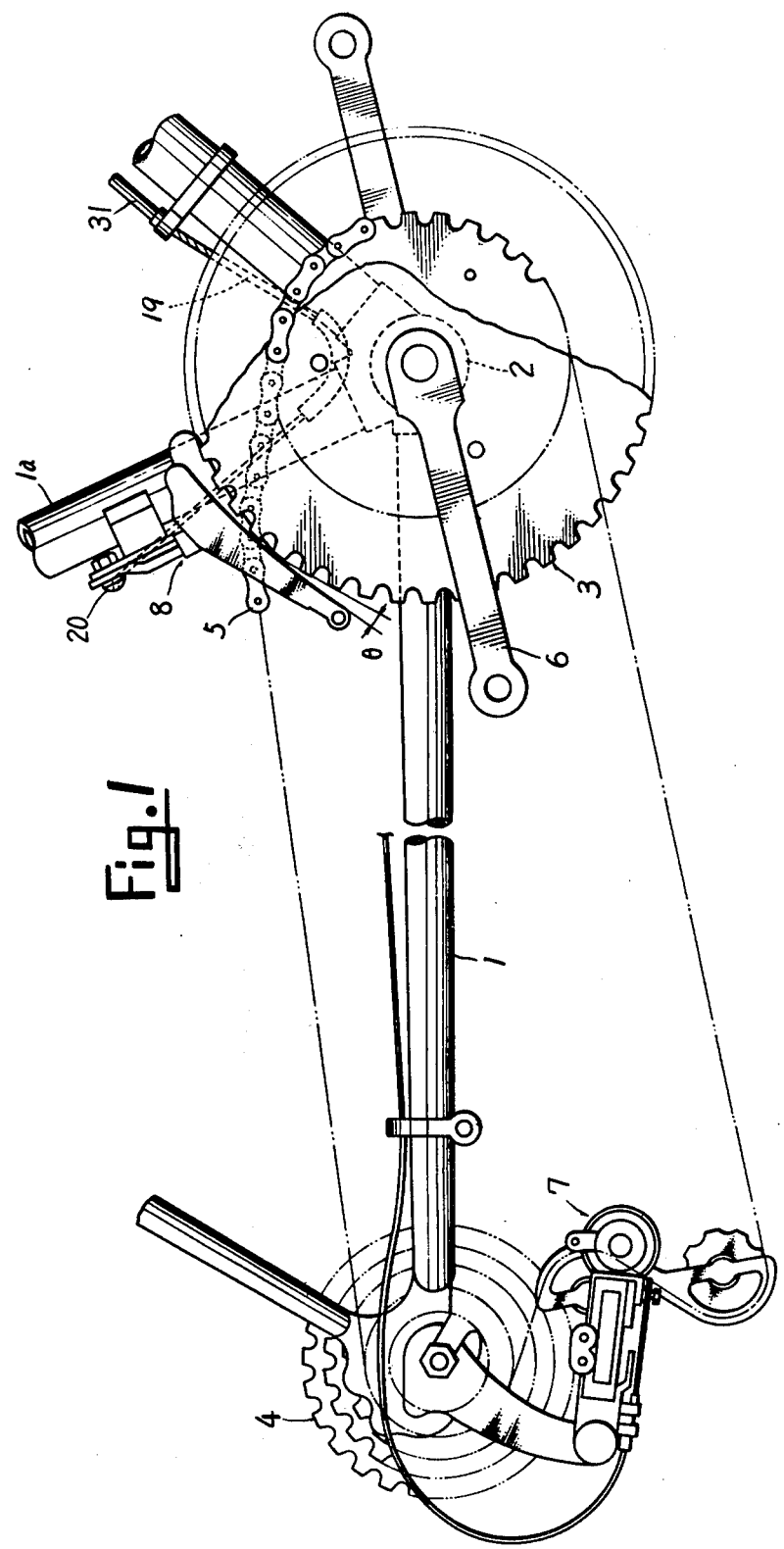

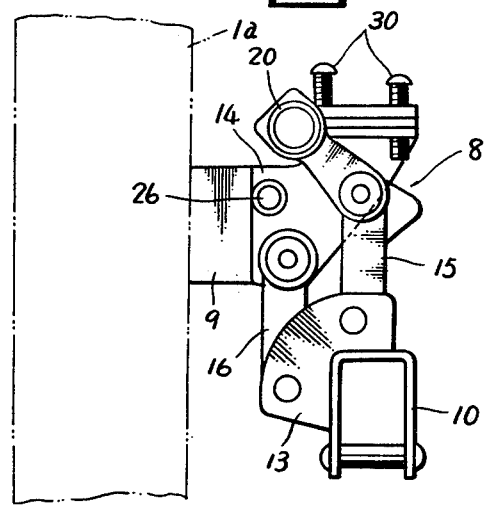
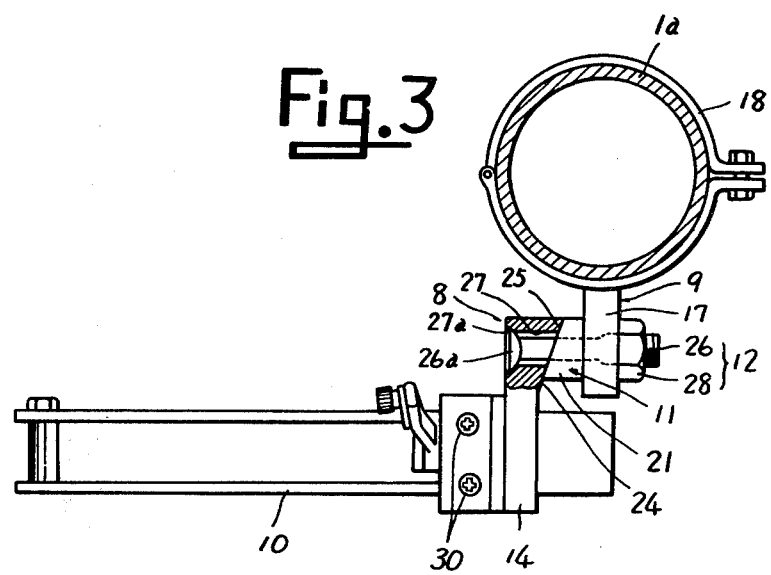

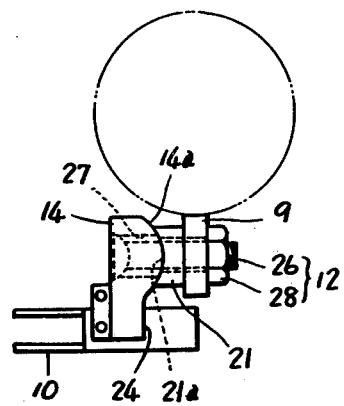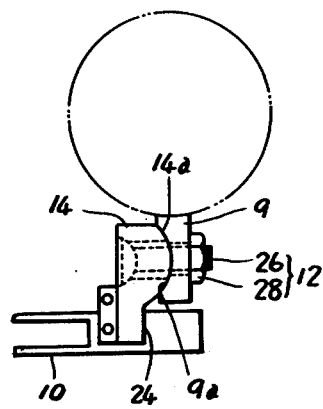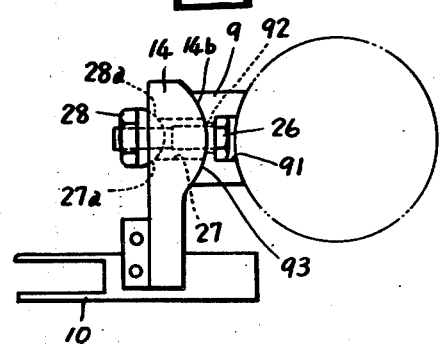

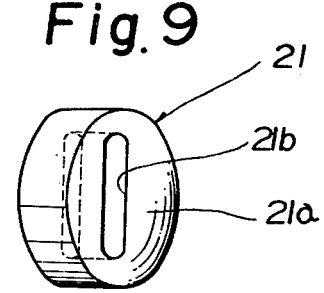
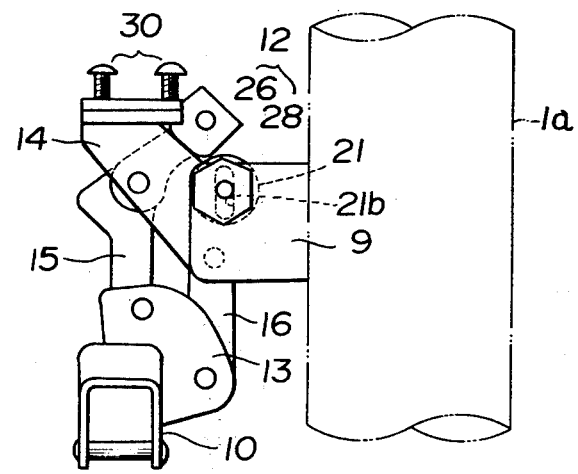
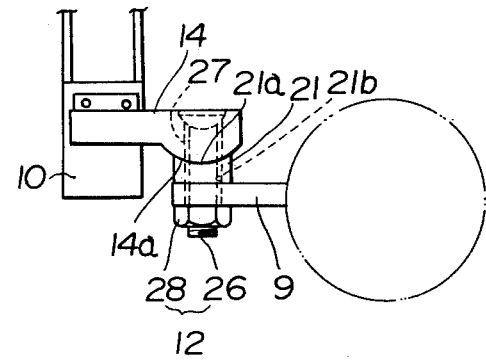

FRONT DERAILLEUR

This invention relates to a front derailleur for a bicycle and more particularly to a front derailleur for switching a driving chain to each of at least two sprockets at a crank means of the bicycle.

Conventionally, derailleurs provided at front and rear sprockets have been used as a multiple-speed transmission of the bicycle. This kind of transmission has front sprockets of different diameters according to a type of bicycle or a user's request. When such different diameter sprockets are used, a chain guide at the front derailleur may not be fitted to the outer periphery of the sprocket, thereby being positioned improperly vertically with respect to the sprocket or angled improperly with respect to a bottom bracket causing an unsmooth and unreliable switching of the chain to a desirable sprocket for changing the speed.

This problem can be eliminated by use of a tightening band which is attached to a fixing member of the front derailleur and which is movable up and down and around with respect to the bicycle frame so that the fixing member carrying the chain guide may be adjusted to achieve a correct position and angular orientation. The chain guide, however, is fixed to a movable member movable with respect to the fixing member through two linkage members, and the angle of the chain guide with respect to the outer periphery of each of the sprockets (which angle is hereinafter called the fitting angle) is always constant regardless of the adjustment of the fixing member. Hence, there is still the problem that when using a different diameter sprocket the chain guide is not properly fitted to the outer periphery of the sprocket.

In addition, the aforesaid fitting angle means the angle between the reference line extending lengthwise of the chain guide and the tangent at the point at the outer periphery of the sprocket, the point corresponding to the center of a portion of the chain guide having a width within which the chain is switched. The angle is shown in FIG. 1 by $\theta$.

This invention has been designed to solve the aforesaid problem. A main object of the invention is to provide a front derailleur which is simply adjusted with respect to the sprocket regardless of its kind so that the chain guide may be positioned easily and reliably for most properly changing the speed. Another object is to provide a front derailleur capable of reliably maintaining the chain guide in its position after being adjusted most properly.

The front derailleur of the invention is characterized in that the chain guide is supported with respect to the fixing member in relation of being movable axially of the sprockets and toward at least two positions corresponding to the sprockets respectively, an adjusting means is provided for adjusting the chain guide in each of the two positions corresponding to each of the sprockets, especially of its fitting angle to the outer periphery of each of the sprockets, and a sustaining means is provided at the adjusting means so that the chain guide may be kept in its adjusted position.

Figure 8:
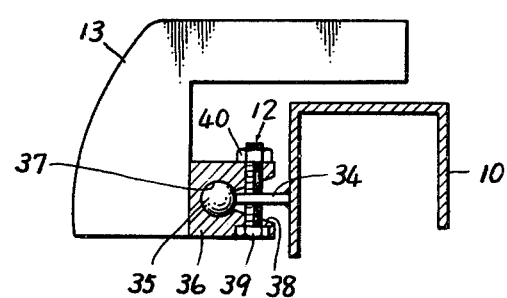

These and other objects and advantages of the invention will become more apparent in the detailed description in accordance with the accompanying drawings, in which:

FIG. 1 is a side view showing the front derailleur of the invention applied to the front sprockets at the transmission of the bicycle, FIG. 2 is a front view of an embodiment of the front derailleur of the invention, FIG. 3 is a partially cutaway plan view thereof, FIGS. 4 through 6 are partially omitted plan views of modified embodiments of the invention, FIG. 7 is a partially cutaway front view of another modified embodiment of the invention, FIG. 8 is a partially omitted and partially cutaway front view of a further modified embodiment of the invention.

FIG. 9 is a perspective view of a washer used in a further modification of the invention, FIG. 10 is a rear view of the further modification incorporating the FIG. 9 washer, and FIG. 11 is a plan view of the FIG. 10 embodiment.

Referring to FIG. 1, a transmission having the front derailleur of the invention applied thereto is shown. The reference numeral 1 designates a frame of the bicycle. The frame 1 has at the forwardly lower portion thereof a bottom bracket 2 to which is mounted a plurality of sprockets 3 of a larger and a smaller diameter. At the rear of frame 1 a plurality of sprockets 4 of a larger and a smaller diameter are also mounted. A driving chain 5 is stretched across one of the plurality of sprockets 3 and one of the plurality of sprockets 4. A crank arm 6 is connected to the front sprockets to rotate the same, and a rear derailleur 7 is mounted at the rear of the frame 1, so that the front derailleur 8 of the invention or the rear derailleur 7 may allow the chain 5 to be switched to a desirable one of the plurality of sprockets 3 or 4.

At a seat tube 1a of the frame 1 is mounted the front derailleur 8 of the invention for desirably changing the speed in association with the rear derailleur 7. In general, the front derailleur, like known derailleurs comprises a fixing member 9 (FIG. 2) fixed to the frame 1, two linkage members 15 and 16 pivotally supported to the fixing member 9, and a movable member 13 carrying a chain guide 10 pivotally supported to the utmost end of each of the linkage members 15 and 16; the fixing member 9, two linkage members 15 and 16 and movable member 13 being connected in the form of a parallelogram as shown in FIG. 2. Between the fixing member 9 and one of the linkage members 15 and 16, or the movable member 13 and one of the linkage members 15 and 16, is inserted a return spring (not shown) for urging the movable member toward the smaller diameter sprocket of the plurality of sprockets 3. One of the linkage members 15 and 16 is, as shown in FIG. 2, extended to provide a retainer 20 for a control wire 19. The control wire 19 is pulled against the return spring to swing the linkage members 15 and 16 so that the chain guide 10 may be moved axially of the sprockets 3 and toward two positions corresponding to each of the plurality of sprockets 3, particularly, from the position corresponding to a smaller diameter sprocket to a larger diameter one. On the other hand, the wire 19 is loosened to move the chain guide 10 reversely through the return spring force from the larger diameter sprocket to the smaller one, thus switching the driving chain, shown in FIG. 1, to one of the sprockets 3. In addition, the reference numeral 30 designates a stopper, and 31, an outer sheath guiding the wire 19 and fixed at one end to the frame 1.

To the well-known construction of the front derailleur described above, an adjusting means 11 is provided for making the chain guide 10 adjustable of its position with respect to the fixing member 9, in other words, the position with respect to each of the sprockets 3 at the aforesaid two positions, particularly the fitting angle, and a sustaining means 12 is provided at the adjusting means 11 so that the chain guide 10 may be kept in its adjusted position. The adjusting means 11 serves to adjust the fitting angle (represented by $\theta$ in FIG. 1) desirably correspondingly to each sprocket in use, so that the chain guide 10 may properly be positioned along the outer periphery of each of the sprockets 3. The adjusting means 11 will be clarified in the following description in accordance with FIGS. 2 through 8, and the sustaining means 12 is preferably a bolt and a nut and will be hereinafter represented as such.

Embodiments of the front derailleur of the invention will be detailed in accordance with FIGS. 2 through 8.

Referring to FIGS. 2 and 3, the derailleur 8 has the fixing member 9 to which a support 14 is attached, the support 14 carrying the linkage members 15 and 16, and between the fixing member and support is provided the adjusting means 11.

The fixing member 9 shown in FIGS. 2 and 3, comprises a mounting plate 17 having a mounting face for carrying therewith the support 14 and a tightening band 18 through which the mounting plate 17 is fixed to the seat tube 1a, the tightening band 18 being loosened to adjust the chain guide 10 up and down and around the seat tube 1a. Incidentally, the fixing member 9 may directly be fixed to the seat tube 1a by means of welding or the like.

The adjusting means 11 between the fixing member 9 and support 14 is, as shown in FIG. 3, composed of an adjusting washer 21 inserted therebetween. The adjusting washer 21 employs a slant washer having two axial end faces, one face 25 of which is slant and opposite to the support 14. In the constitution shown in FIG. 3, the support 14 is also slant at one side 24 thereof opposite to slant axial end face 25 of the washer 21. The one axial face 25 and the one end axial end side 24 are brought into contact with each other, and the washer 21 is rotated around a headed bolt 26 used as the sustaining means 12, thereby enabling the chain guide 10 to be adjusted in its position with respect to the fixing member 9.

In greater detail, the headed bolt 26 used for the sustaining means 12 has a countersunk convex head and projects through the support 14, washer 21 and fixing member 9. The support 14 has a through hole 27 of a much larger diameter than the outer diameter of the bolt 26 and is concaved around the hole at one side from which the bolt is inserted and is slant at the other side. The washer 21 is inserted between the fixing member 9 and support 14 so that the axial end face 25 of the washer and the slant side 24 of the latter are abutted against each other, and then the bolt 26 is screwably tightened at its tip with the nut 28, thus fixing the support 14 to the fixing member 9.

The washer 21 may be slant at one face against the fixing member 9, as well as the other face against the support 14 as foregoing, in brief, at least one of the two axial end faces of the same may be slant with respect to the axis thereof.

As an alternative, the abutment of the support 14 against at least one axial end face of the washer 21 may be made semispherical. Referring to FIG. 4, the support 14 is swollen semispherical at the one side 24 to form a convex area 14a and the washer 21 is concaved at the one axial end face 25 to form a concave area 21a, the convex 14a and concave 21a areas being abutted. The bolt 26 is inserted through the support 14, washer 21 and fixing member 9, and screwably tightened by the nut 28, thus fixing the support to the fixing member.

The adjusting means 11 shown in FIG. 5 employs no adjusting washer. In this instance, the fixing member 9 is recessed to be semispheric at its one side facing the support 14 so as to form a concave area 9a, the concave area 9a being abutted against the aforesaid convex area 14a at the support 14. The bolt 26 is inserted through both the members to be screwably tightened by the nut 28, thereby fixing the support 14 to the fixing member 9. In addition, both the swollen portion and recess are not limited to the convex and concave shapes down any shape is applicable.

Referring to FIG. 6, the adjusting means is similar to that shown in FIG. 5 but support 14 is further made movable up and down with respect to the fixing member 9, i.e., lengthwise of the seat tube 1a, thereby enabling the chain guide 10 to be adjusted of its position up and down as well as the fitting angle to the outer periphery of each of the sprockets.

In greater detail, the fixing member 9 is extended over a given length lengthwise of the seat tube 1a to be formed in a shape as shown in FIG. 6, that is, the fixing member has at the rear side a groove 91 extending lengthwise thereof and at the front a slot 92 similarly extending and opening at the groove 91, and is recessed to be a lengthwise concave area 93 at the front. The support 14 is outwardly swollen at one side facing the fixing member 9 to be a convex area 14b extending in a given length lengthwise of the support, so that the convex area 14b is abutted against the concave area 93 in relation of being vertically movable and desirably turnable. At the central portion of the swollen portion 14b is bored a hole 27 through between both sides of the support 14 and at the rear side with respect to the fixing member 9 is formed a concave area 27a around the hole 27.

The headed bolt 26 for fixing the support 14 to the fixing member 9 in position projects through the slot 92 and hole 27 and its head is fitted into the groove 91 and the tip is projected out of the outer side of the support 14 to be screwably screwed with a nut 28. The nut 28 is formed semispherical at its one face so as to be insertably engaged with the concave area 27a. In addition the through hole 27 has a considerably larger diameter than the outer diameter of the bolt 26 like in the former embodiment.

The FIG. 6 embodiment may also be modified to use the washer arrangement of FIG. 4 by providing a washer 21 between support 14 and fixing member 9, as illustrated in FIGS. 10 and 11, to permit up and down movement of the chain guide 10. In this arrangement washer 21, better illustrated in FIG. 9, has a slot 21b therein. A headed bolt 26 is inserted through a hole 27 and passes through slot 21b to support the washer while permitting its vertical movement. The bolt 26 is screwed with a nut 28 to hold the support 14 and fixing member 9 in an adjusted position.

Next, the method for adjusting the chain guide 10 in its position with respect to the sprockets 3 and in its fitting angle to the outer periphery of each of the sprockets 3 will be detailed with respect to the foregoing constructions.

Firstly, in the embodiment of FIG. 3, the nut at the sustaining means 12 is loosened to turn the adjusting washer 21 so that the contact angle between the axial end face 25 at the washer 21 and that 24 at the support 14 is changed to cause the chain guide 10 to be moved at both lengthwise ends thereof vertically together with the support 14 on a base of the washer 21, thereby adjusting the fitting angle of the chain guide to the outer periphery of each of the sprockets 3, and thereafter, the sustaining means 12 is tightened to keep the support 14 rigidly through the countersunk convexed head 26a of the bolt 26 in close contact with the countersink at one end of the through bore 27 of the support 14 even if the support 14 is slant with respect to the washer 21.

In this instance, when adjusting the chain guide 10 up and down with respect to the seat tube 1a or around the axis of the bottom bracket 2 to get a desirable angle, the tightening band 18 used for fixing therethrough the mounting plate 17 to the seat tube 1a as shown in FIG. 3 is loosened to thereby carry out the adjustment.

In the FIG. 4 embodiment, the nut of the sustaining means 12 is similarly loosened to allow the support 14 to move up and down through the abutment of the convex area 14a of the support 14 against the concave area 21a of the washer 21 until the inner surface of the through hole 27 contacts with the bolt 26, thereby adjusting the fitting angle. Also, the support 14 is, like in the previous embodiment, turned transversely so as to adjust the chain guide 10 in its angle with respect to the axis of the bottom bracket 2.

In the FIG. 5 embodiment, the nut is, similarly to FIG. 4, loosened to allow the support 14 to be turned vertically and transversely so as to adjust the fitting angle of the chain guide and the angle with respect to the axis of the bottom bracket 2.

In the FIG. 6 embodiment, the nut is loosened to allow the support 14 to be slid vertically or turned transversely so as to adjust the chain guide 10 in its vertical position, its fitting angle and the angle with respect to the axis of the bottom bracket 2.

The FIGS. 10 and 11 embodiment operates likewise with both the support 14 and washer 21 being vertically movable.

After adjusting the chain guide 10 and keeping it in its adjusted position by the sustaining means 12, the inner wire 19 is pulled or released to move the linkage members 15 and 16 as a parallelogram and simultaneously the chain guide 10 axially of the sprocket through the movable member 13, thereby switching the chain 5 to the desirable diameter sprocket for changing the speed.

As seen from the aforesaid description, all the embodiments thus described have the adjusting means 11 provided between the fixing member 9 and support 14, the adjusting means may be provided between the movable member 13 and chain guide 10. This construction will be described in accordance with FIG. 7.

The adjusting means 11 shown in FIG. 7 consists of an adjusting washer 32 inserted between the movable member 13 and chain guide 10. The washer 32 and chain guide 10 have a concave area 32a and a convex area 10a in contact therewith as in the embodiment in FIG. 4 and are made turnable with respect to the movable member 13, thereby making adjustable the position of chain guide relative to the fixing member 9.

In greater detail, the washer 32 is, as in the embodiment in FIG. 4, concaved at one of the two flat axial end faces thereof, the one face being opposite to the chain guide 10 and being recessed in a semispherical shape to form a concave holding face 32a. The chain guide 10 is swollen at the intermediate portion of one side plate at a side of the movable member 13 outwardly toward the movable member by use of a press or the like so as to form a semispherical portion 33 which is abutted against the concave holding face 32a at the washer 32. A bolt 26 of a countersunk semispherical head 26a projects from the inside of the semispherical portion 33 to a side wall of the movable semispherical member 13 through the washer 32 and is screwably fastened at the tip by a nut 28, thereby rotatably mounting the chain guide 10 to the movable member 13.

The adjusting washer 32, which has only one concave axial face opposite to the movable member 13 as aforegoing, may be concaved at both axial end faces, in which case the movable member also has a semispherical swollen portion. In brief, in this embodiment, it is sufficient that the washer 31 has at least one concave face on its two axial faces.

The sustaining means 12 may, as shown in FIG. 8, be constructed without the adjusting washer 32. In this embodiment, a ball 35 outwardly projects from one side wall of the chain guide 10 through a rod 34 while one side wall of the movable member 13 has a mating support 36 fixed thereto. The support 36 has a hollow area 37 of ball-like shape and has at the outer surface facing the chain guide 10 an opening 38 communicating with the hollow area 37, through which opening the ball 35 is inserted to engage with the hollow area 37. The ball 35 is, after insertion, held in the hollow of the support 36 which is clamped by the sustaining means 12 formed of a bolt 39 and a nut 40, the bolt projecting transversely through the opening and being fastened by the nut, thereby fixing the chain guide 10 to the movable member 13.

In the construction shown in FIGS. 7 and 8, the method for adjusting the chain guide 10 fitting angle with respect to each of the sprockets 3 even when one sprocket is replaced by another of different diameter detailed as follows:

Referring to FIG. 7, the nut of sustaining means 12 is loosened to move one the chain guide 10 vertically or transversely at both lengthwise ends thereof through the semispherical portion 33 of the chain guide 10 moving along the concave holding face 32a of the washer 32, thereby obtaining a desirable fitting angle or a desired angle with respect to the axis of the bottom bracket 2.

After these adjustments the nut 28 is tightened to secure the chain guide 10 in the adjusted position even slanted with respect to the movable member 13 because the bolt head 26 of a countersunk convexed shape is forcibly pressed against the semispherical countersink at the inner surface of the semispherical portion 33.

In the FIG. 8 embodiment, the nut 40 of sustaining means 12 is loosened to allow the ball 35 to be movable within the hollow 37 to thereby adjust the chain guide 10 in its fitting angle and the angle with respect to the axis of the bottom bracket 2.

In both FIGS. 7 and 8, after the chain guide 10 is adjusted in position the inner wire 19 is pulled to move the linkage members 15 and 16 as a parallelogram and the chain guide 10 is simultaneously moved axially of the sprocket 3 through the movable member 13, thereby switching the chain 5 to a given diameter sprocket for changing the speed.

As seen from the aforesaid description, the front derailleur of the invention is simply adjustable correspondingly to the sprockets in use regardless of their kind so that the chain guide is may be positioned most properly for changing the speed and kept at a desired position easily and permitting a reliable, thus reliably and smooth changing of the bicycle speed through the chain guide which is accurately positioned with respect to the outer periphery of each of the sprockets.

Although the invention has been described with reference to several different embodiments, these embodiments are merely exemplary and not limiting of the invention which is defined solely by the appended claims.

What is claimed is:

1. A front derailleur for a bicycle, which is used for selectively switching a driving chain among at least two sprockets, said front derailleur comprising:
   (a) a fixing member fixed to a frame of the bicycle;
   (b) a chain guide supported to said fixing member, said chain guide being movably axially of each of said sprockets with respect to said fixing member and toward at least two positions corresponding to each of said sprockets and serving to switch said driving chain from one of said sprockets to another;
   (c) an adjusting means for adjusting the position of said chain guide with respect to said fixing member, said adjusting means comprising an extension having a first adjusting face connected to one of said chain guide and fixing member and a receiving surface having a second adjusting face connected to the other of said chain guide and fixing member, said second adjusting face engaging with the first adjusting face of said extension, said first and second adjusting faces being movable relative to one another to adjust the fitting angle of said chain guide relative to the outer periphery of said sprocket, said front derailleur further comprising sustaining means for maintaining the adjusted position of said chain guide with respect to said fixing member, so that said chain guide may be adjusted in its position with respect to said fixing member by means of said adjusting means and kept in the adjusted position by means of said sustaining means.

2. The front derailleur according to claim 1, wherein said chain guide is supported to said fixing member through two linkage members and a movable member, and a support for supporting said linkage members is mounted to said fixing member.

3. The front derailleur according to claim 2, wherein said adjusting means is provided between said support and fixing member so that said chain guide may be adjusted in its position with respect to each of said sprockets.

4. The front derailleur according to claim 2, wherein said adjusting means is provided between said movable member and chain guide so that said chain guide may be adjusted in its position with respect to each of said sprockets.

5. The front derailleur according to claim 3, wherein said adjusting means includes an adjusting washer as said extension which is inserted between said support and fixing member, said washer being movable to change the position of said support with respect to the fixing member, thereby adjusting said chain guide in its position with respect to each of said sprockets.

6. The front derailleur according to claim 5, wherein said washer has a slant surface on at least one of its two axial end faces forming said first adjusting face, said one axial end face being slanted with respect to the axis of said washer, such that movement of said slant surface relative to said second adjusting face causes a change in position of said support to thereby adjust said chain guide in its position with respect to each of said sprockets.

7. The front derailleur according to claim 5, wherein said washer has a concave surface on at least one of its two axial end faces forming said first adjusting face, such that movement of said concave surface relative to said second adjusting face causes a change in position of said support to thereby adjust said chain guide in its position with respect to each of said sprockets.

8. The front derailleur according to claim 5, wherein said washer is movable upwardly and downwardly with respect to said fixing member.

9. The front derailleur according to claim 3, wherein said adjusting means includes a swollen portion as said extension which is formed at one of said support and fixing member and a recess as said receiving surface formed at the other of said support and fixing member to receive said swollen portion therein, said swollen portion being insertably engaged with said recess in relation of being positionally changeable, thereby adjusting said chain guide in its position with respect to each of said sprockets.

10. The front derailleur according to claim 9, wherein said swollen portion is made convexed and said recess is concaved, thereby adjusting said chain guide with respect to each of said sprockets.

11. The front derailleur according to claim 4, wherein said adjusting means includes an adjusting washer as said extension which is inserted between said movable member and chain guide, so that said chain guide is made changeable of its position with respect to said movable member by means of said washer, thereby being adjusted in the positiion with respect to each of said sprockets.

12. The front derailleur according to claim 11, wherein said washer is made concave at at least one of two axially end faces thereof forming said first adjusting face so that said chain guide may be adjusted in its position with respect to each of said sprockets.

13. The front derailleur according to claim 11, wherein said washer is moved up and down with respect to said movable member.

14. The front derailleur according to claim 4, wherein said adjusting means includes a support provided at said movable member as said receiving surface and having a spherical hollow, and a spherical body projected from said chain guide as said extension, said spherical body being rotatably housed within said hollow, thereby adjusting said chain guide in its position with respect to each of said sprockets.

15. The front derailleur according to claim 1, wherein said sustaining means comprises a bolt and a nut to keep said chain guide in its adjusted position.

16. The front derailleur according to claim 15, wherein said bolt has a countersunk convex head.

17. The front derailleur according to claim 15, wherein said nut has a contact face formed in a substantially semispheical shape.

18. The front derailleur as in claim 3, wherein said fixing member is elongated and provided with a longitudinal groove and slot therein, and said adjusting means includes a concave area running lengthwise of said fixing means as said receiving surface, and a mating convex area provided on said support as said extension, said convex area being slidable along said concave area and turnable with respect thereto to thereby adjust said chain guide with respect to each of said sprockets.

* * * * *